United States Patent [19]

Itoh

[11] 4,114,181

[45] Sep. 12, 1978

[54] RECORDING REPRODUCER FOR MAGNETIC CARDS

[75] Inventor: Tadanao Itoh, Tokyo, Japan

[73] Assignees: Ricoh Company, Ltd.; Ricoh Educational Equipment Co., Ltd., both of Tokyo, Japan

[21] Appl. No.: 731,679

[22] Filed: Oct. 12, 1976

[30] Foreign Application Priority Data

Dec. 8, 1975 [JP] Japan .................................. 50-146087
Dec. 16, 1975 [JP] Japan .................................. 50-150414
Oct. 18, 1975 [JP] Japan .......................... 50-142028[U]
Oct. 18, 1975 [JP] Japan .......................... 50-142029[U]

[51] Int. Cl.$^2$ ......................... G11B 25/04; G11B 5/52
[52] U.S. Cl. ........................................... 360/2; 360/81
[58] Field of Search .............. 360/2, 81; 235/61.11 D, 235/61.12 M; 35/35 R, 35 J

[56] References Cited

U.S. PATENT DOCUMENTS

| | | | |
|---|---|---|---|
| 3,412,483 | 11/1968 | Jacobs | 360/2 |
| 3,624,311 | 11/1971 | Emden | 360/2 |
| 3,665,163 | 5/1972 | Mast et al. | 360/2 |
| 3,866,827 | 2/1975 | Obarz et al. | 360/2 |
| 3,953,887 | 4/1976 | Kobylarz | 360/2 |

Primary Examiner—Vincent P. Canney
Attorney, Agent, or Firm—Cooper, Dunham, Clark, Griffin & Moran

[57] ABSTRACT

A recording reproducer is disclosed for use with a magnetic card comprising a non-magnetic material such as paper having a coating of a powder of magnetizable material on its back surface. The recording reproducer includes a transducer element such as a magnetic head which translates a magnetic energy into electrical energy or vice versa. In the region of the coating of magnetizable material, a sound track is formed on the card for recording a sound. By moving the magnetic head from a start position toward a terminal position of the sound track while maintaining contact between the head and the track, the sound is reproduced. The magnetic head may be returned instantaneously from the terminal position, or an arbitrary intermediate position between the terminal position, and the start position to the start position, whereby the sound can be repeatedly reproduced by repeating the playback and returning motion.

6 Claims, 42 Drawing Figures

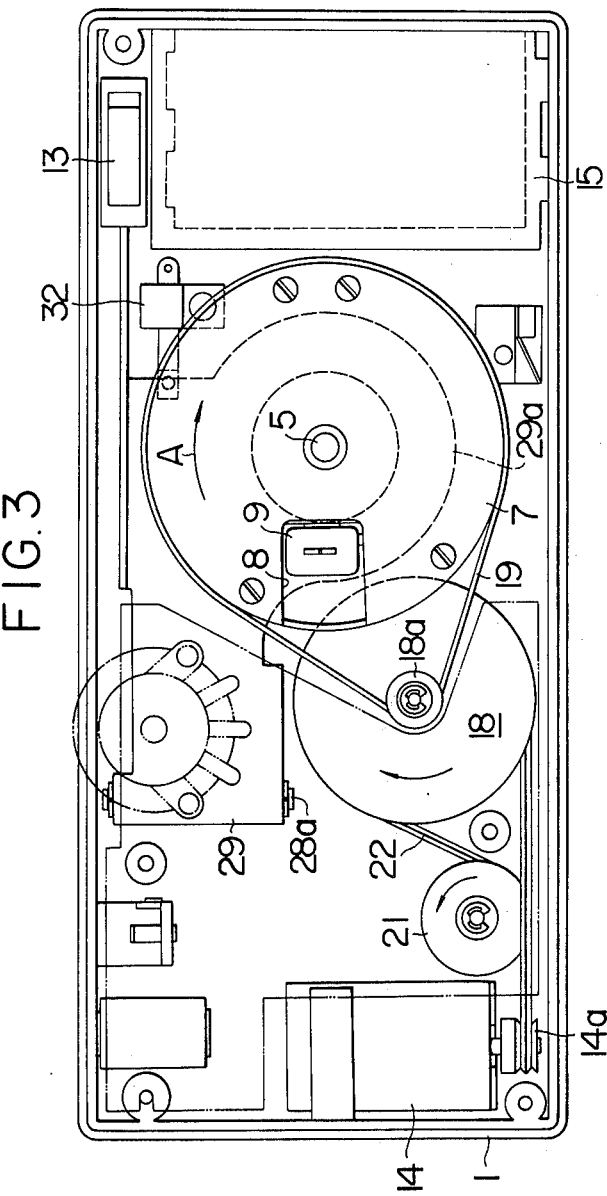
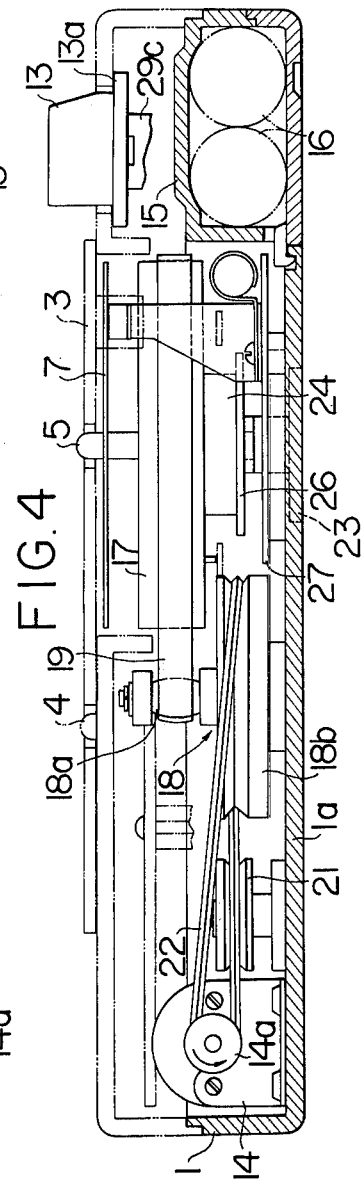
FIG.3
FIG.4

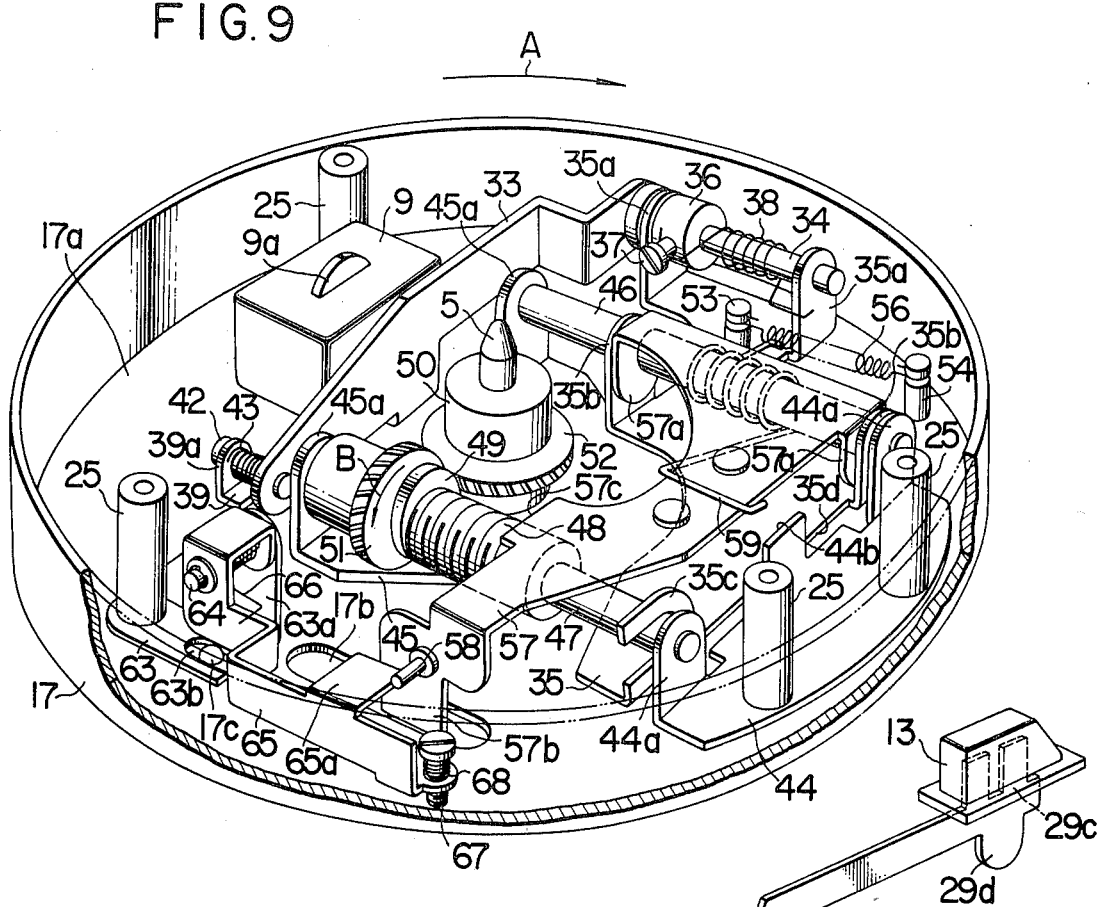
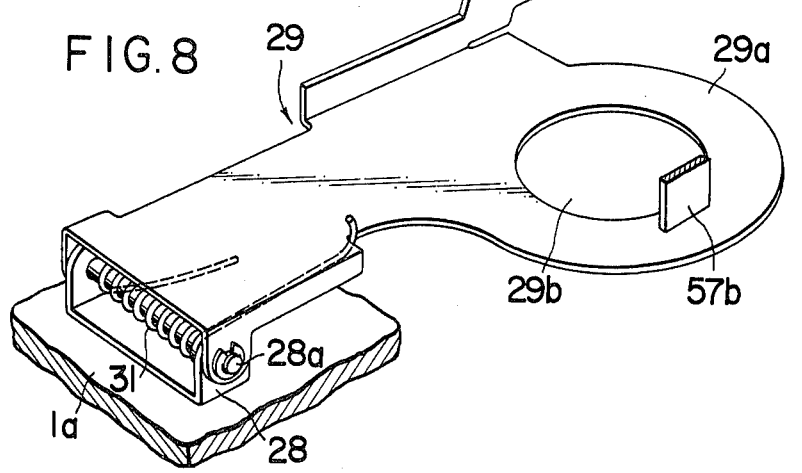

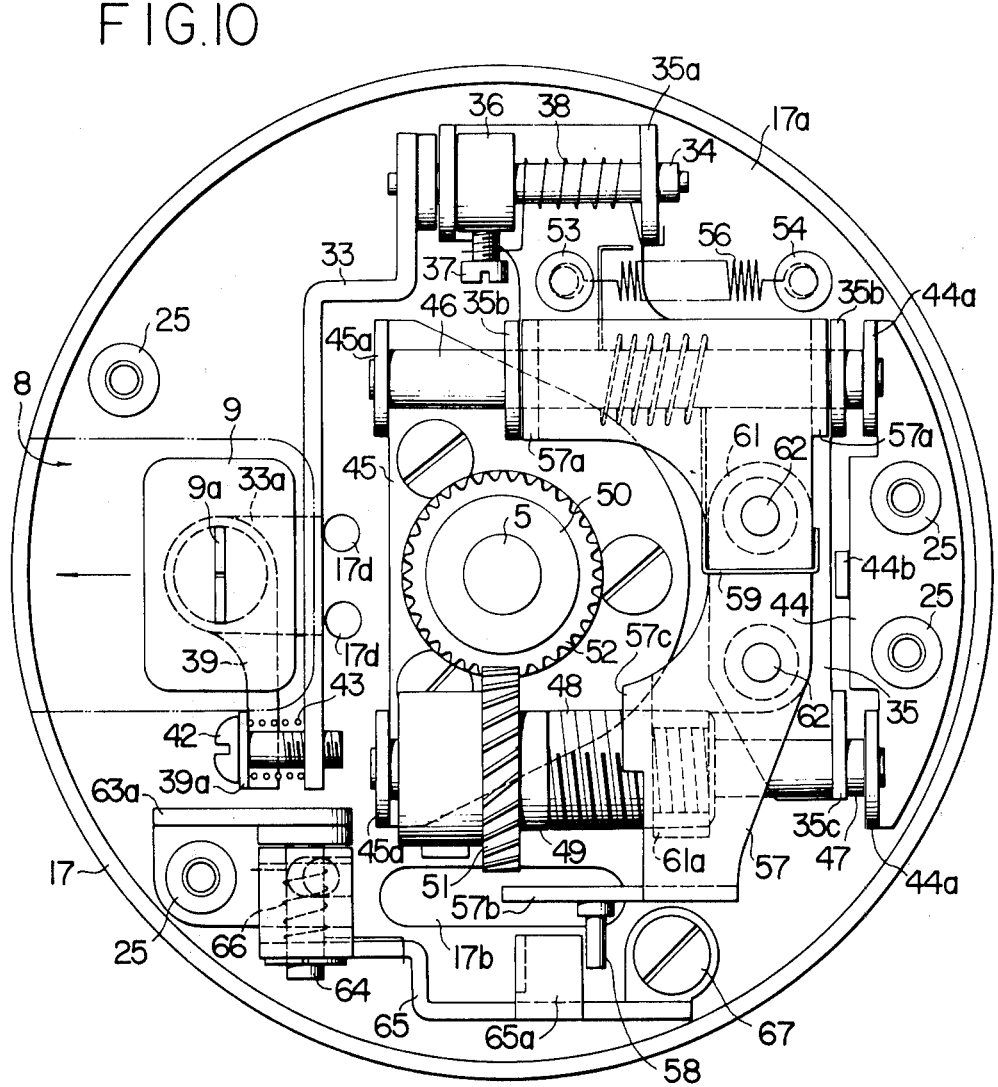

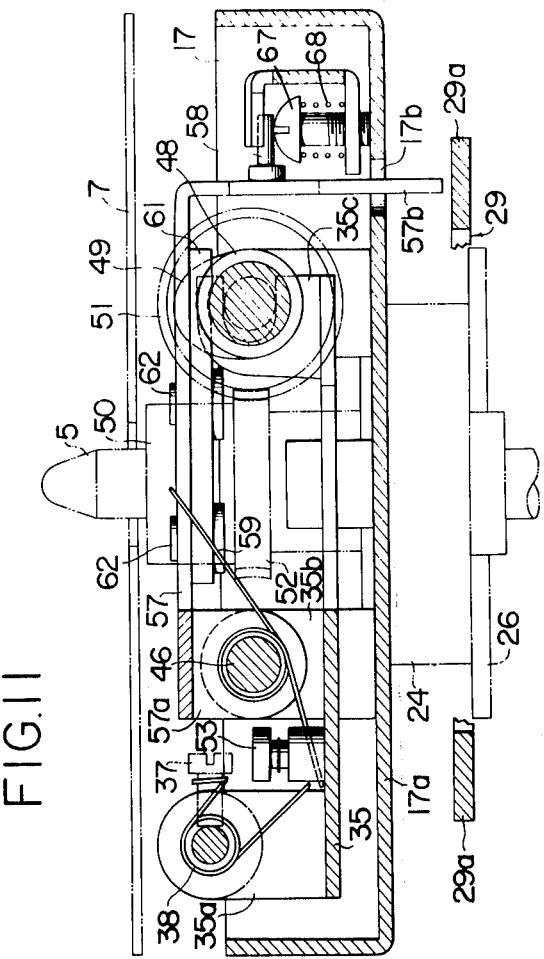
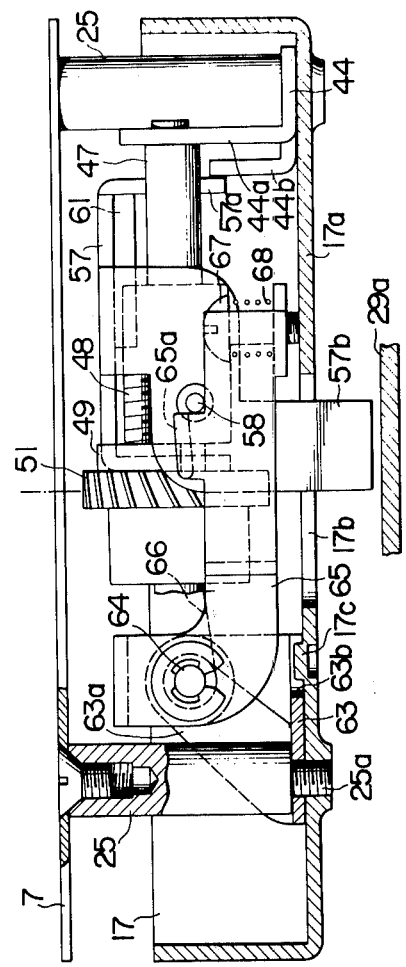
FIG.11
FIG.13

RECORDING REPRODUCER FOR MAGNETIC CARDS

BACKGROUND OF THE INVENTION

The invention relates to a recording reproducer, and more particularly to a recording reproducer capable of recording and reproducing a sound of a relatively short duration, which is particularly preferred for use in a learning instrument.

Tape recorders and spiral magnetic sheet recorders are known which may be used as learning instruments. A variety of acoustic signals may be recorded on or reproduced from these tapes and magnetic sheets for the purpose of learning a language, for example. The record has a minimum duration of at least 20 minutes on magnetic tapes and at least 4 minutes on magnetic sheets.

For the beginner who desires to learn a foreign language by utilizing such tape or magnetic sheet, it may be desirable to listen to a simple, basic sentence repeated in the same tone. This can be achieved by repeatedly reproducing the desired portion of the recorded tape or magnetic sheet. However, this entails the necessity of rewinding the recorded tape in a tape recorder, for example. If one desires to listen to the same sentence repeatedly, the tape recorder must be operated as many times as he desires, which is inconvenient. Furthermore, when a plurality of short sentences designated by A, B, C, ... N, ... are recorded on a single tape, if the student desires to listen to the sentence N, he must locate the corresponding recorded portion by running the tape, which is again very troublesome. The same problem is encountered with a spiral magnetic sheet recorder.

SUMMARY OF THE INVENTION

The present invention provides a recording reproducer for use with magnetic cards. On its back surface, the card is formed with a sound track in which an acoustic content of a relatively short duration is recorded. The front surface of the card carries a legible information corresponding to the content recorded in the sound track. The reproducer includes a record/playback unit including a magnetic head. The record/playback unit has the function of moving the magnetic head from a start toward a terminal position while maintaining it in contact with the sound track, thereby performing a recording or playback operation. In addition, the record/playback unit has the function of instantaneously returning the magnetic head to the start position.

More specifically, the record/playback unit achieves a recording or playback operation by moving the magnetic head from the start to the terminal position of the sound track. Subsequently, the magnetic head is instantaneously returned to the start position. In addition, the record/playback unit has an additional function of returning the magnetic head from an arbitrary position intermediate the start and the terminal position to the start position. The record/playback operation and the returning motion form one cycle of operation, which can be repeated by depression of a pushbutton so as to repeatedly reproduce a short sentence.

One of the features of the recording reproducer of the invention is the fact that the student can reproduce a desired sentence from a recorded content on a sound track in a simple manner as many times as he desires. Another feature is the legible indication of information which corresponds to the recorded content, on the front surface of the card, thereby permitting a visual recognition of the content on the rear surface. Consequently, it can be said that the most significant effect obtained with the invention is the achievement of the repeated reproduction of basic short sentences, which is recognized to be the most important and effective way of learning a language but which has been difficult to achieve with prior art tape recorders. This achievement is combined with visual learning.

Therefore, it is an object of the invention to provide a recording reproducer for use with magnetic cards which permits relatively short sentences to be repeatedly recorded and reproduced.

It is another object of the invention to provide a recording reproducer for magnetic tapes of the type mentioned above which enables visual learning.

The above and other objects will become apparent from the following detailed description of the invention with reference to the drawings.

BRIEF DESCRIPTION OF THE DRAWINGS

FIG. 3 is a plan view of the recording reproducer, showing overall arrangement;

FIG. 4 is a front view, partly in section, of the recording reproducer;

FIG. 8 is a perspective view, principally illustrating the mounting of a control lever;

FIG. 9 is a perspective view of a record/playback head returning mechanism;

FIG. 10 is a plan view of the returning mechanism;

FIG. 11 is a left-hand side elevation, partly in section, of the returning mechanism;

FIG. 13 is a front view, partly in section, as viewed from below in FIG. 10;

DETAILED DESCRIPTION OF PREFERRED EMBODIMENTS

Figure 1:
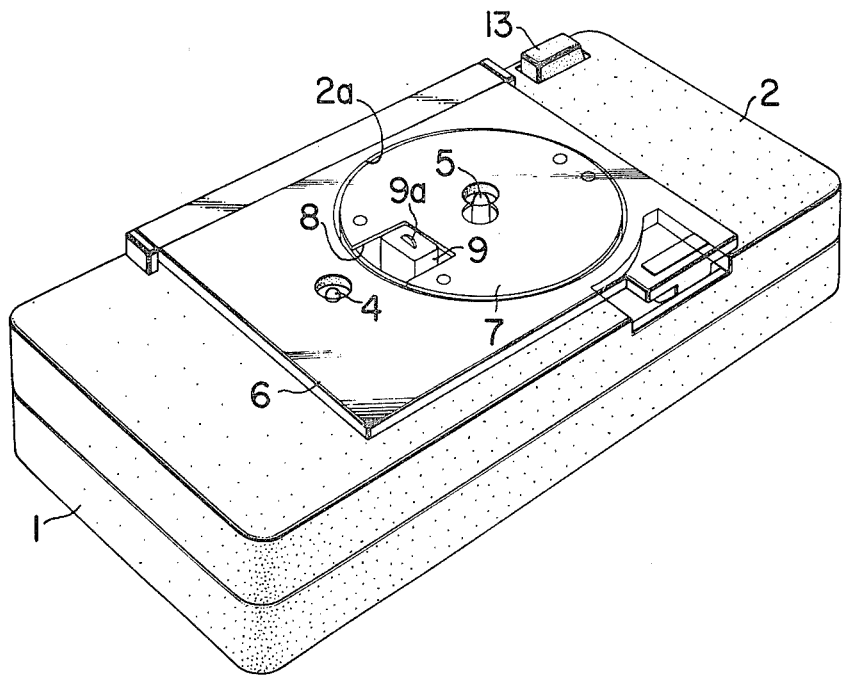
FIG. 1 is a perspective view of a recording reproducer constructed in accordance with one embodiment of the invention, principally illustrating the external appearance thereof.
Figure 2:
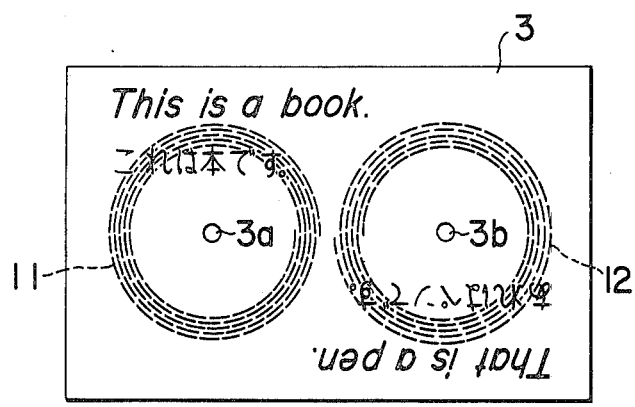
FIG. 2 is a plan view of a card which may be used in the present invention.

Referring to FIG. 1, there is shown the outer appearance of a recording reproducer for use with magnetic cards which is constructed in accordance with the invention. The reproducer includes a casing 1 having a top plate 2. The card 3 shown in FIG. 2 is adapted to be placed on the top plate, and has a pair of positioning apertures 3a, 3b which may be fitted on a locating pin 4 on the top plate 2 and a shaft 5, thereby correctly locating the card 3 on the top plate 2. A transparent retaining plate 6 is hinged to one lateral edge of the casing so as to hold the card 3 against the top plate 2. The top plate 2 is formed with a circular opening 2a in which is disposed a panel 7, the latter being operable substantially integral with a turntable to be described later. The panel 7 is formed with a radially extending groove 8 of a relatively short length which receives a transducer element, in the form of a magnetic head 9 in the present example. The magnetic head 9 is adapted to rotate with the turntable and cooperates with a feed screw to move progressively toward the outer periphery of the turntable during its rotation. Thus the magnetic head 9 traces a spiral locus as the turntable rotates.

Referring to FIG. 2, the card 3 is of a size comparable to a name card for the convenience of handling. Several tens of cards may be disposed in a stack so as to be contained in a card case, for example. A pair of magnetic tracks 11, 12 having appropriate sounds magnetically recorded therein are formed on the back surface of the card 3, while the front surface carries a legible indication such as "This is a book." corresponding to the content recorded in the track 12 and "That is a pen." corresponding to the content recorded in the track 11. The card 3, in the position shown in FIG. 2, is disposed in place on the top plate 2 and covered by the retaining plate 6. Under this condition, the magnetic track 12 is aligned with the magnetic head 9, and as a pushbutton 13 is depressed, the turntable begins to rotate, whereby the magnetic head 9 follows a spiral path relative to the track surface while contacting it to reproduce the sound "This is a book." When reproducing from the track 11, the card 3 is rotated before disposing it in place on the top plate 2, so as to be able to reproduce the sound "That is a pen." Each magnetic track has a vocabulary or a sentence having a duration on the order of 3 to 60 seconds recorded therein, and while the pushbutton 13 is left depressed, the magnetic head 9 moves from its start to its terminal position. Upon termination of a playback operation, the head 9 automatically returns to the starting position, thus allowing the sound to be reproduced as many times as desired by repeating the described operation. The apparatus also has the function of stopping the magnetic head at an arbitrary position intermediate the start and the terminal position and returning it from such position to the start position, thus enabling a repeated hearing of a desired portion of the content recorded in the magnetic track.

The specific construction of the recording reproducer according to the invention will now be described. Referring to FIGS. 3 and 4, there is shown a drive motor 14 which is energized by a battery 16 contained within a battery casing 15. A belt 19 extends around the periphery of a turntable 17 and a smaller pulley 18a of a stepped pulley assembly 18, while a belt 22 extends around a larger pulley assembly 18b of the stepped pulley 18 and a motor pulley 14a, the belt 22 also extending around a pulley 21. When the motor pulley 14a rotates in the direction indicated by an arrow, the turntable 17 and hence the panel 7 operable substantially integral therewith rotates in the direction indicated by an arrow A at a reduced speed. As shown in greater detail in FIG. 5, the shaft 5 is fitted in a stationary member 23 secured to a bottom plate 1a, and the turntable 17 is fixedly mounted on a holder 24 which is rotatable relative to the stationary shaft 5. The panel 7 is connected with the turntable 17 by stanchions 25 (see FIG. 13) for integral rotation therewith about the shaft 5.

Figure 5:
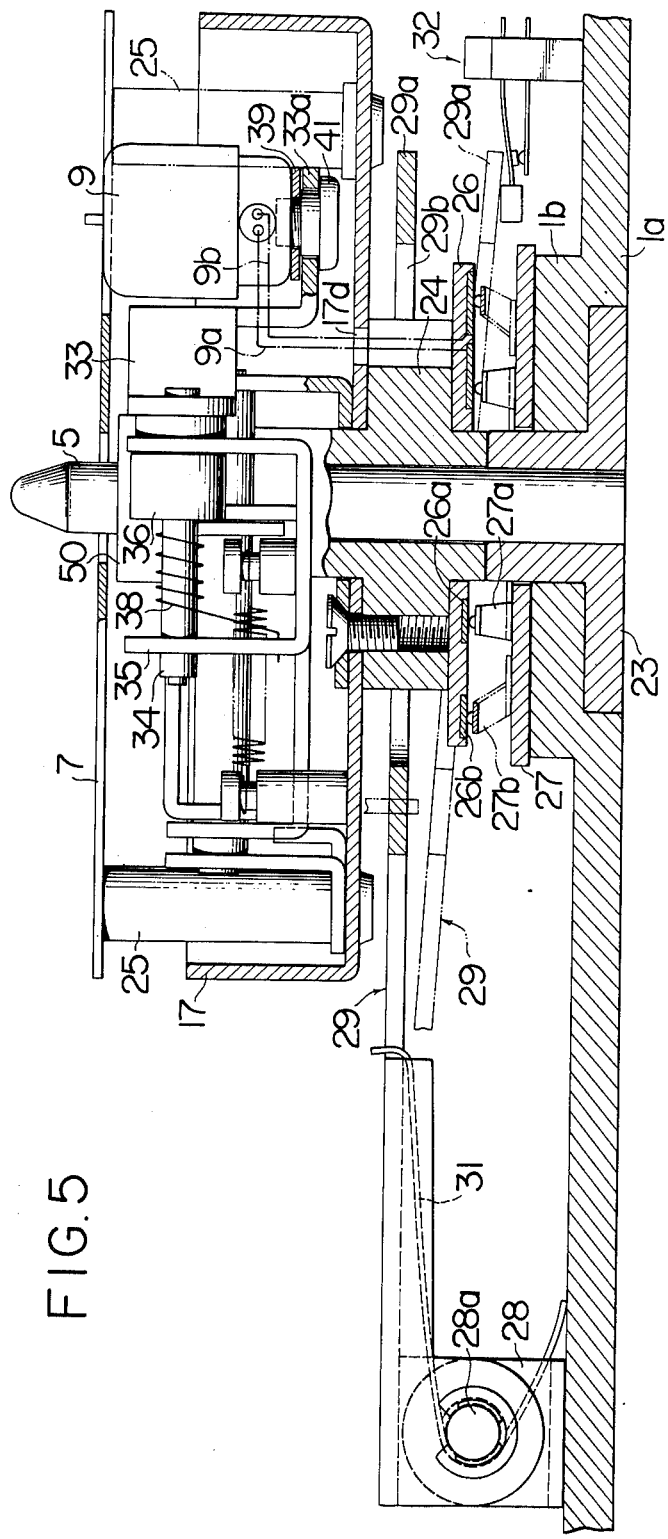
FIG. 5 is a front view, partly in section, of a peripheral mechanism associated with the turntable.
Figure 7:
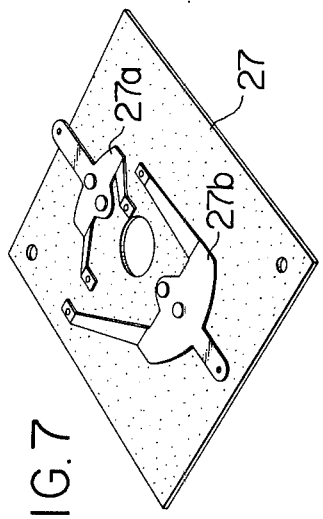
FIGS. 6 and 7 are perspective views of a movable contact board and a stationary contact board.
Figure 6:
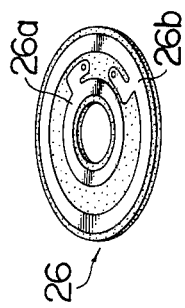

With continued reference to FIG. 5, the holder 24 has a contact board 26 secured to the lower end thereof, the board 25 carrying annular contacts 26a, 26b formed thereon as shown in FIG. 6. A stationary contact board 27 carrying a pair of stationary contact pieces 27a, 27b of configurations shown in FIG. 7 is secured to the upper end of a boss 1b of the bottom plate 1a, with the contact pieces being maintained in contact with the annular contacts. A pair of lead wires 9a, 9b extending from the magnetic head 9 are connected with the annular contacts 26a, 26b on the contact board 26. Threadably secured to the left-hand end, as viewed in this Figure, of the bottom plate 1a is a support member 28 carrying a shaft 28a thereon, on which one end of a control lever 29 (see FIG. 8) is rotatably mounted. At its free end, the control lever 29 is formed with an upstanding piece 29c on which the button 13 is mounted. The lever also includes a disc portion 29a having a circular opening 29b formed centrally therein, within which the holder 24 (see FIG. 5) is located. The lever 29 is biased by a spring 31, disposed on the shaft 28a, to rotate counterclockwise about the shaft 28a, as viewed in FIG. 5. However, the resulting movement of the lever is limited by the abutment of a flange 13a (FIG. 4) on the button 13 against the topplate of the body 1. As viewed in FIG. 5, the right-hand end of the bottom plate 1a carries a switch member 32 which is adapted to close its contacts when the disc portion 29a of the control lever 29 has moved from a position shown in solid line to a position shown in phantom line, by an action to be described later.

Referring to FIG. 9, a shaft 34, which is fitted into and fixed to one end of a support lever 33, is also rotatably mounted in upstanding supports 35a which are integrally formed on a holding member 35. A spring 38 is disposed on the shaft 34 to urge it in rotation, for which it has one end secured to a screw 37 which is used to secure a spacer 36 to the shaft 34 and its other end anchored to one upstanding support 35a of the holding member 35. The support lever 33 serves to pivotally support a transducer element such as the magnetic head 9, which is fixedly mounted thereon. Referring to FIGS. 10 and 5 (FIG. 10 being a top view), head 9 is mounted on an extension 33a extending from the lower edge of the support lever 33, and an adjusting plate 39 is mounted between the extension 33a and the magnetic head 9. The magnetic head 9, plate 39 and extension 33a are joined by a fastening member 41 which is inserted from the under side of the extension 33a. The adjusting plate 39 has an upstanding piece 39a through which a screw 42 extends, with the threaded end thereof engaging in the support lever 33. A spring 43 is interposed between the upstanding piece 39a and the lever 33, so that the screw 42 can be turned against the resilience of the spring 43 to adjust the degree of parallelization of the magnetic head 9 relative to the track on the card 3 (see FIG. 2). In this manner, the magnetic head 9 is mounted on the support lever 33, which is biased by the spring 38 to rotate in a direction to cause the magnetic head 9 to move upward, the resulting rotation being limited by a stationary member, not shown, so that the head 9 may be maintained in the position shown in FIG. 5.

Referring to FIG. 9, a pair of holding plates 44, 45 are fixedly mounted on the bottom plate 17a of the turntable 17 and have pairs of upstanding portions 44a, 45a, on which a pair of guide shafts 46, 47 are mounted in parallel relationship with each other. One of the guide shafts, 47, carries a feed screw 48 as a feed member, a cam 49 and a bevel gear 51 which are substantially integrally mounted. The bevel gear 51 meshes with another bevel gear 52 fixedly mounted on a sleeve 50 which is substantially integral with the shaft 5, and as the turntable 17 rotates in the direction of the arrow A about the shaft 5, the bevel gear 51 rotates in the direction of an arrow B while meshing with the stationary bevel gear 52. In addition to the previously-noted upstanding supports 35a, the holding member 35 is formed with another upstanding support 35b which fits on the guide shaft 46, and a supported piece 35c which is supported by the guide shaft 47. Pins 53 and 54 are fixedly mounted on the holding member 35 and on the bottom plate 17a of the turntable 17, respectively, and a tension spring 56 is disposed therebetween for returning the magnetic head to its start position (see FIG. 10). The resilience of the spring 56 biases the support member 35 together with an operating lever 57 to slide to the right, as viewed in FIG. 10, on the respective guide shafts 46, 47. The sliding movement is limited by the abutment of a right-hand edge 35d of the holding member 35 against an upstanding piece 44b from the holding plate 44. Under this condition, the magnetic head 9 mounted on the support lever 33 is retained in its start position shown in FIG. 10. (This will be further described later.)

At one end, the operating lever 57 is formed with a folded piece 57a which is rotatably mounted on the guide shaft 46 and is held by the upstanding support 35b of the support member 35. At its free end, the operating lever 57 is formed with a downwardly depending operating piece 57b on which a control pin 58 is fixedly mounted. The operating lever 57 is biased by a spring 59, disposed on the guide shaft 46 with one end secured to the lever 57 and its other end anchored to the support member 35, to rotate clockwise about the shaft 46, as viewed in FIG. 11. This bias causes the operating piece 57b to move downwardly, whereby the operating piece 57b extends through an elongate slot 17b formed in the bottom plate 17a of the turntable 17 and bears against the disc portion 29a of the control lever 29, as shown in FIG. 8, thus limiting the rotation.

Figure 12:
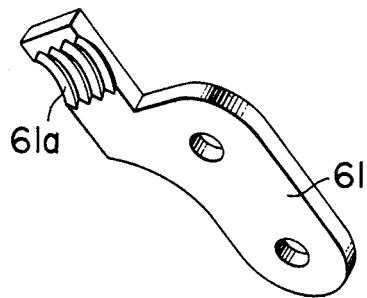
FIG. 12 is a perspective view of a half nut.
Figure 14:
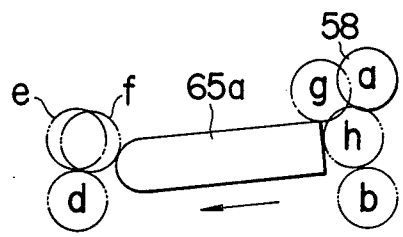
FIG. 14 is a schematic view for illustrating the movement of a control pin on an operating lever relative to a control piece of a constraining lever.

Referring to FIG. 10, a half nut 61 having a threaded portion 61a as shown in FIG. 12 is clamped by caulking pins 62 to the under surface of the operating lever 57, and the threaded portion 61a is engageable with or disengagable from the feed screw 48 by an action to be described later. Referring to FIGS. 9 and 10, a shaft 64 which is mounted on an upstanding portion 63a of a mounting member 63, has a constraining lever 65 pivotally mounted thereon. A spring 66 disposed on the shaft 64 and having one end secured to the lever 65 and its other end secured to the shaft 64 biases the lever 65 to rotate clockwise about the shaft 64, with the resulting rotation being limited by the abutment of a screw 67 attached to the free end of the lever 65 against the bottom plate 17a of the turntable 17. The mounting member 63 which holds the constraining lever 65 is fixedly mounted by threadably engaging a threaded portion 25a of the stanchion 25 with the bottom plate 17a. A projection 17c embossed integrally from the rear side of the bottom plate 17a fits in a U-shaped notch 63b formed in the mounting member 63, thereby holding the shaft 64 in an immovable manner. The constraining lever 65 has a control piece 65a extending from the upper edge thereof toward the operating piece 57b of the operating lever 57. By an action to be described later, the control piece 65a is adapted to engage the control pin 58 on the operating lever 57. The control pin 58 normally assumes a position a relative to the control piece 65a, as shown in FIG. 14. Under this condition, the threaded portion 61a of the half nut 61 mounted on the operating lever 57 is maintained in non-meshing relationship with the feed screw 48 or is removed from engagement with the screw 48 but in opposing relationship therewith (see FIGS. 10 and 12).

In operation, a card 3 having a sound content of a relatively short duration on the order of 3 to 60 seconds recorded thereon is placed on the top plate 2 so as to engage the shaft 5 and the locating pin 4 (see FIG. 1). Under this condition, the magnetic track 12 on the card 3 has its start position located in a corresponding manner to the tip portion 9a of the magnetic head 9. When the retaining plate 6 is closed, the tip portion 9a is brought into abutment against the magnetic track surface. When the button 13 is depressed, the control lever 29 shown in FIG. 8 rotates clockwise about the shaft 28a against the resilience of the spring 31, with a projection 29d of the lever 29 bearing against the bottom plate 1a of the casing 1. Thus, in the position shown in phantom line in FIG. 5, the disc portion 29a causes the contacts of the switch member 32 to be closed. Thereupon, the power circuit from the battery 16 is turned on, with the motor 14 being set in motion to cause the turntable 17 and the panel 7 to rotate in the direction of the arrow A in FIG. 3.

Referring to FIG. 9, as the turntable 17 rotates, the bevel gear 51 which meshes with the stationary bevel gear 52 is rotated in the direction of the arrow B, causing the feed screw 48 to rotate in the same direction. The aforementioned clockwise rotation of the control lever 29 causes the disc portion 29a to descend, whereby the operating lever 57 having its operating piece 57b in abutment against the disc portion 29a (see FIG. 8) rotates under the resilience of the spring 59, about the shaft 46 in a direction such that its free end moves downward. The resulting rotation brings the threaded portion 62a of the half nut 61 (see FIG. 12) which is mounted on the lever 57, into meshing engagement with the feed screw 48 as shown in FIG. 11, and at the same time the operating piece 57b is held away from the disc portion 29a while the control pin 58 shifts from its normal position a to another position b shown in FIG. 14. As the feed screw 48 rotates in the direction of the arrow B, the operating lever 57 moves to the left, as viewed in FIG. 10, on the guide shaft 46 against the resilience of the spring 56, together with the support member 35 which is also guided by the guide shaft 47. The resulting movement of the support member 35 causes the support lever 33 to move the magnetic head 9 from its start position in a direction indicated by an arrow along the slot 8 (see FIG. 1) formed in the panel 7. This, together with the rotation of the turntable 17, achieves a spiral motion of the head 9 with respect to card 3, thus reproducing the sound from the track 12. For example, a sound "This is a book." (see FIG. 2) is reproduced.

Figure 15:
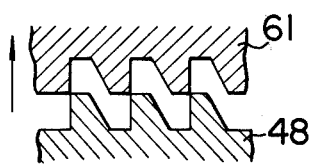
FIG. 15 is a section illustrating the moment when the disengagement between the half nut and a feed screw takes place.

Referring to FIG. 14, when the half nut 61 is brought into meshing engagement with the feed screw 48, the control pin 58 moves down from the position a to the position b, and then moves from the position b to the left during the continued feeding operation of the feed screw 48. The horizontally moving control pin 58 pushes up, though slightly, the control piece 65a against the resilience of the spring 66 (see FIG. 9), until it reaches a position d. When the control pin 58 reaches the position d, a playback operation over a maximum duration (for example, 60 seconds) terminates. At this point, the projection 57c from the operating lever 57 (see FIG. 9) is located opposite the cam 49 and is pushed upward by a portion of the cam 49 which has an increased diameter. In this manner, the operating lever 57 is rotated counterclockwise about the shaft 46, as viewed in FIG. 11, against the resilience of the spring 59. As shown in FIG. 15, the half nut 61 is then disengaged from the feed screw 48, whereby the magnetic head 9 stops at this terminal position.

Referring to FIG. 11, the free end of the operating lever 57 moves upward as it is rotated counterclockwise by the cam 49, so that the control pin 58 moves vertically upward from the position d to a position e as shown in FIG. 14, whereby the half nut 61 is disengaged as shown in FIG. 15. Simultaneously, it shifts from the position e to a position f under the action of the spring 56. If a playback operation is terminated at this point by releasing the depression of the button 13 (see FIG. 8), the control lever 29 returns from a position shown in phantom line to its original position shown in solid line as indicated in FIG. 5. Also the contacts of the switch member 32 are opened to stop the rotation of the turntable 17. Under this condition, the control pin 58 will be returned from the position f to the position a as indicated in FIG. 14 and is held in the position a by the abutment of the operating piece 57b against the disc portion 29a of the control lever 29 which has previously been returned to its original position. The shifting of the control pin 58 takes place in the following manner. Specifically, referring to FIG. 9, the operating lever 57 moves to the right very rapidly together with the support member 35 under the resilience of the spring 56, and is stopped by the upstanding piece 44b which serves as a stop. The control pin 58 thus returns from the position e to the position a as indicated in FIG. 14, and the magnetic head 9 is returned very rapidly from its terminal to its start position.

In order to repeat a playback operation, the pushbutton 13 may be held depressed by a conventional pushbutton automatic locking mechanism. Under such circumstances, referring to FIG. 14, the control pin 58 moves from the position a to the position f in the manner mentioned above, but then it is displaced to a position g. Since the operating lever 57 is not constrained by the control lever 29 as a result of the depression of the button 13, the control pin 58 moves from the position g through a position h to the position b under the resilience of the springs 56 and 59. Subsequently, the the described operation is repeated. More specifically, during the time the control pin 58 moves from the position e to the position b, the magnetic head 9 instantaneously returns to its start position, and the half nut 61 on the operating lever 57 meshes with the feed screw 48 to resume a feeding of the magnetic head 9. In this manner, a desired sound can be reproduced as many times as desired, by repeating such operation.

Figure 16:
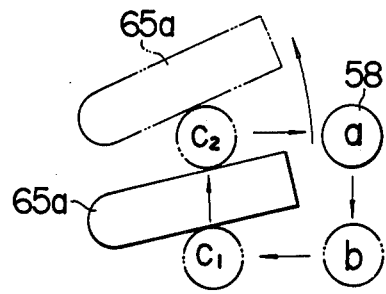
FIG. 16 is a schematic view showing a displacement of the control piece as a result of an upward movement of the control pin.

In order to interrupt the playback operation at an intermediate position on the magnetic track 12 of the card 3, the pushbutton 13 may be released at a desired position by a conventional pushbutton unlocking mechanism. Referring to FIG. 16, when the pushbutton 13 is depressed, the control pin 58 moves down from the position a to the position b as mentioned previously, and is then displaced to a position $c_1$ by a feeding action of the feed screw 48. This results in raising the control piece 65a slightly upward from the position shown in FIG. 14 to its position shown in FIG. 16. When the button 13 is released under this condition or at an intermediate position on the magnetic track, the control lever 29 will rotate about the shaft 28a under the resilience of the spring 31 from its position shown in phantom line to its normal position shown in solid line (see FIG. 5). During this rotation, the relatively strong resilience of the spring 31 (see FIG. 5) causes the disc portion 29a of the control lever 29 to push the operating piece 57b of the operating lever 57 upward (see FIG. 9). Thereupon, the control pin 58 on the operating lever 57 which now assumes the position $c_1$ shown in FIG. 16 moves the control piece 65a of the constraining lever 65 further upward, causing the lever 65 to rotate about the shaft 64, until a position $c_2$ is reached. In effect, this operation takes place against the resilience of the spring 59 acting on the operating lever 57 and the spring 66 acting on the constraining lever 65, so that the resilience of the spring 31 acting on the control lever 29 (see FIG.

5) must be greater than the sum of the resilience of both springs 59, 66. As a result of an upward movement of the operating piece 57b, the operating lever 57 rotates counterclockwise about the shaft 46, as viewed in FIG. 11, disengaging the half nut 61 from the feed screw 48. Simultaneously with this disengagement, the operating lever 57 is returned to its original position shown in FIG. 9 together with the support member 35, under the resilience of the spring 56. At the same time, the support lever 33 causes the magnetic head 9 to return to its start position. Referring to FIG. 16, the control pin 58 now returns from the position $c_2$ to the position $a$, and the constraining lever 65 rotates clockwise about the shaft 64 under the resilience of the spring 66 (see FIG. 9), returning to its original position in which the screw 67 bears against the bottom plate 17a of the turntable 17. It is to be noted that the position of the control piece 65a relative to the control pin 58 can be adjusted by turning the screw 67 through a compression spring 68. In this manner, the magnetic head 9 can be returned to its start position from any intermediate position on the magnetic track. It is to be understood that such operation can be repeated as many times as desired.

The magnetic head 9 can be automatically returned by an alaternative means, which will be described below with reference to FIGS. 9 and 17. Specifically, the cam 49 on the guide shaft 47 is replaced by a release cam 71 of the form shown in FIG. 17. The release cam 71 includes a sharp edge 71a which serves to guide a pin 73a on a release lock lever 73 to be described later. A screw 72 is threadably engaged with the bottom plate 17a of the turntable 17, and a compression spring 74 is mounted thereon. One end of release lock lever 73 is held sandwiched between the spring 74 and the bottom plate 17a, whereby it assumes a normal position shown in FIG. 18. The free end of the release lock lever 73 has the pin 73a depending therefrom which extends toward the feed screw 48. Adjacent to the free end, the lever 73 is also formed with a tongue 73b which extends laterally from one lateral edge thereof. Normally the tongue 73b assumes a position below an operating lever 76 which is similar to the operating lever 57 of the previous embodiment. However, it is to be noted that the operating lever 76 of the present embodiment has no control pin mounted thereon. The release lock lever 73 is biased by a tension spring 78 to rotate clockwise about the screw 72, but the resulting rotation is limited by abutment against a stop pin 79.

Figure 17:
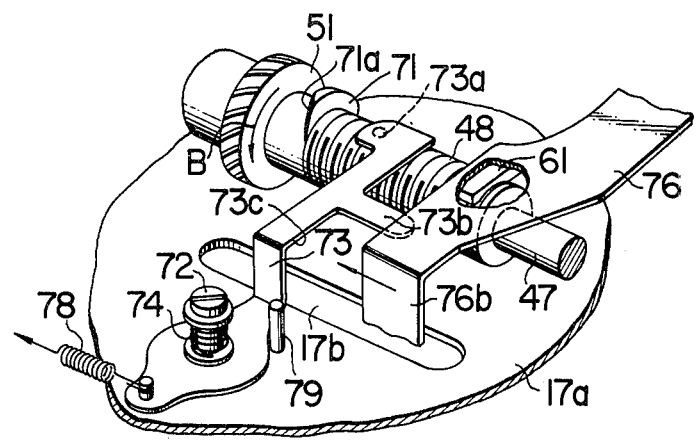
FIG. 17 is a perspective view of another form of a record/playback head feed release mechanism.
Figure 18:
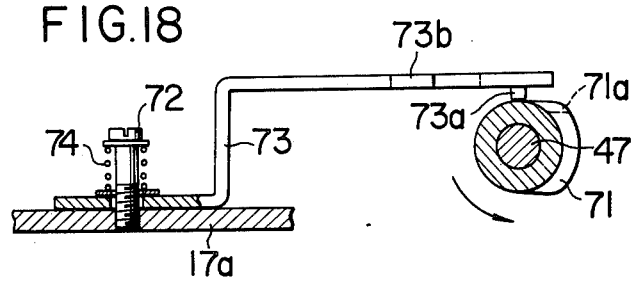
FIGS. 18 and 19 are side elevations illustrating the operation of a release lock lever.
Figure 19:
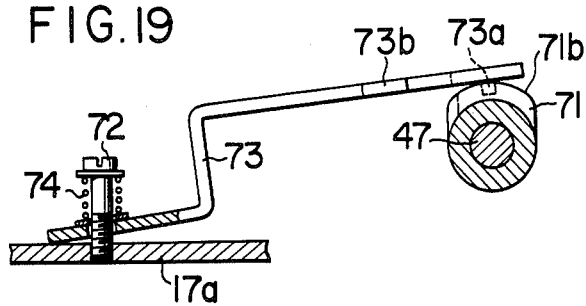

When the pushbutton 13 (FIG. 8) is depressed, the control lever 29 angularly moves about the shaft 28 as mentioned previously, rotating the operating lever 76 in a direction to move the free end thereof in a downward direction, as viewed in FIG. 17. The half nut 61 is then brought into meshing engagement with the feed screw 48, thus beginning to feed the magnetic head 9. The free end of the operating lever 76 now moves closer to the tongue 73b and in a direction indicated by an arrow. Subsequently, an operating piece 76b of the lever 76 bears against the lateral edge 73c of the release lock lever 73, causing it to rotate counterclockwise about the screw 72 against the resilience of the spring 78. Thereupon, the pin 73a on the release lock lever 73 is guided by the edge 71a of the release cam 71, which rotates in the direction indicated by an arrow B, to pass by the side of the bevel gear 51. At this time, the cam 71 pushes the free end of the lever 73 upward. In other words, the lever 73 is angularly moved against the resilience of the spring 74 from a position shown in FIG. 18 to a position shown in FIG. 19. The tongue 73b of the lever 73 drives the free end of the operating lever 76 upward, angularly moving the lever 76 against the resilience of a spring such as the spring 59 (see FIG. 9) to thereby disengage the half nut 61 from the feed screw 48. Thereupon, the operating lever 76 returns to its original position under the resilience of a spring such as the spring 56 (FIG. 9), and this causes the magnetic head to return also to its start position. During this time, the operating lever 76 moves while being constrained by the tongue 73b of the release lock lever 73, so that the disengagement of the half nut 61 is maintained until the operating lever 76 returns to its original position. Referring to FIG. 19, as the release cam 71 rotates, the free end of the release lock lever 72 which bears against it falls down from a peripheral edge 71b thereof, under the action of the spring 74 which causes the lever 73 to move angularly from the position shown in FIG. 19 to the position shown in FIG. 18. The angular movement of the lever 73 results in a downward movement of the tongue 73b, which causes the operating lever 76, which is maintained in abutment against the tongue 73b during the time the button 13 is held depressed, to move angularly in a direction such that its free end moves downward, bringing the half nut 61 again into meshing engagement with the feed screw 48 to repeat the operation mentioned above. When the button 13 is released after the completion of a playback operation, the operating lever 76 is constrained by the control lever 29 as mentioned previously, so that it remains in its original position, without angularly moving in a direction to lower its free end. As a result, when the release lock lever 73 has angularly moved from the position of FIG. 19 to the position of FIG. 18, the tongue 73b is removed from engagement with the free end of the operating lever 76. Upon completion of the release locking operation by the lever 73, that is, when it angularly moves from the position of FIG. 19 to the position of FIG. 18, the pin 73a is disengaged from the cam 71, whereby the lever 73 rotates clockwise about the screw 72 under the resilience of the spring 78, returning to its original position in which it bears against the stop pin 79. The magnetic head can be returned from an intermediate position by releasing the button 13. This causes the control lever 29 to angularly move the operating lever 76 in a direction such that its free end moves upward, whereby the half nut 61 is disengaged from the feed screw 48 and the spring such as spring 56 (see FIG. 9) returns the lever 76, thus returning the magnetic head to its original position.

Figure 20:
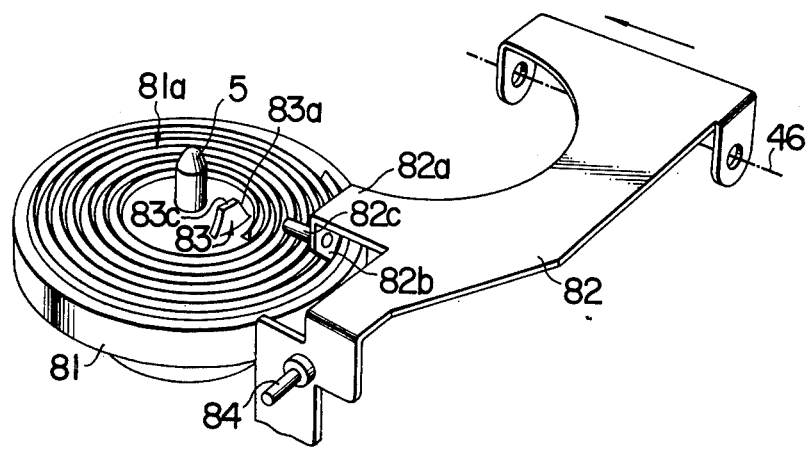
FIG. 20 is a perspective view of another form of record/playback head feed means.
Figure 21:
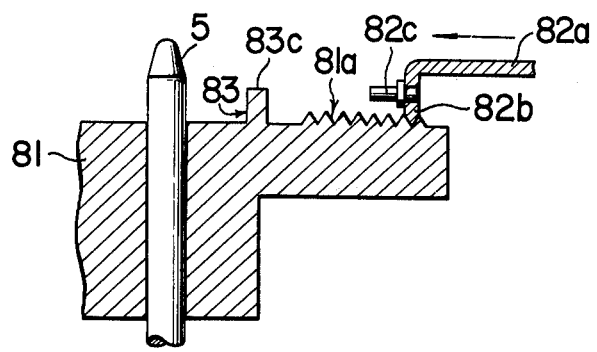
FIG. 21 is a front view, partly in section, of the head feed means shown in FIG. 20.

In the above description, the means for feeding the magnetic head 9 comprises the feed screw 48 and operating lever 57, which however may be replaced by alternative means such as shown in FIG. 20 in the form of a disc member 81 and operating lever 82. In this Figure, disc member 81 having a spirally extending guide groove 81a of V-shaped cross section formed in its top surface is substantially integrally mounted on the stationary shaft 5 (FIG. 9). A projection 82a extends from one lateral edge of operating lever 82 adjacent to its free end, and is formed with a folded piece which is bent from the projection 82a to extend downwardly, the folded piece having a sharp tip 82b which functions as a guide stylus. As the button 13 is depressed, the operating lever 82 rotates about the guide shaft 46 in a direction to move its free end downward, whereby the tip 82b engages the guide groove 81a at its start point, as shown in FIG. 21. At the same time, the turntable 17 rotates in the direction of the arrow A (see FIG. 9), so that the lever 82 is fed in a direction indicated by an arrow. When the magnetic head reaches its terminal position, a pin 82c fixedly mounted on the folded piece engages a feed release cam 83 which is formed on the upper surface of the disc member 81. Specifically, the pin 82c rides along the lateral edge 83a to the top 83c of the cam 83, thereby disengaging the tip 82b from the guide groove 81a and interrupting the feeding operation of the magnetic head. At the same time, the operating lever 82 is returned to its original position under the resilience of the spring 56 (FIG. 9), and the magnetic head also returns to its start position. Thus, the same function as performed by the feed screw can be achieved. A control pin 84 functions in a similar manner to pin 58 mentioned above. It will be seen that if disc member 81 is rotated with turntable 17 and lever 82 and the related support structure is fixed, only linear motion of head 9 will be achieved.

In FIG. 9, a positive meshing engagement between the half nut 61 and the threaded portion of the feed screw 48 is assured by the spring 59, thus precluding any oscillation of the magnetic head 9 and hence misalignment with the track if the position or attitude of the apparatus is changed. This applies also to the arrangement shown in FIG. 20. It will be noted that since the returning motion of the magnetic head takes place in a short interval, the loss time or a waiting time during a repeated hearing is minimized, thus permitting a very efficient repeated hearing. Referring to FIG. 5, it will be seen that this motion is facilitated by the electrical contact arrangement wherein the lead wires 9a, 9b from the magnetic head 9 are passed through an opening 17d (see FIG. 10) formed in the turntable 17 before being connected with the movable contacts 26a, 26b. The contact board 26 on which these contacts are mounted rotates together with the turntable 17, whereby a signal from the magnetic head 9 is fed to an amplifier through the stationary contacts 27a, 27b which are adapted to engage the movable contacts, thus providing a very simple and compact contact arrangement. It will be understood that when to the apparatus of the invention is provided with an eraser and a microphone unit, the apparatus has a recording capability in addition to the playback capability.

Figure 22:
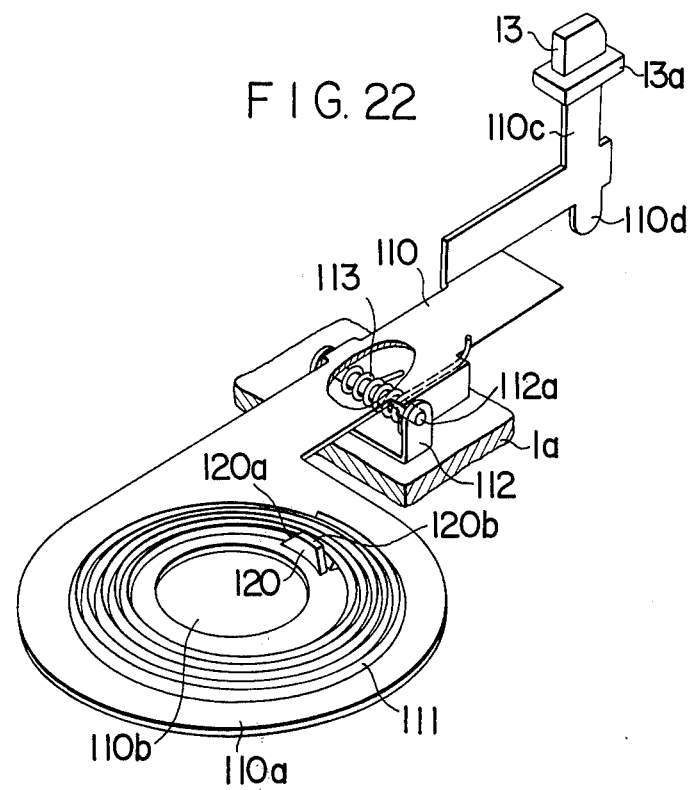
FIG. 22 is a perspective view of a feed lever which is used in combination with a further form of head feed means.

FIG. 22 shows alternative means for returning the magnetic head from an intermediate position to its start position. In FIG. 22, a feed lever 110 serving as a feed member is formed at one end with a disc 110a which is provided with a spirally extending guide groove 111 of V-shaped cross section. The holder 24 which supports the turntable 17 (see FIG. 5) is located centrally within a circular opening 110b formed in the disc 110a. Thus, the feed lever 110 is arranged in a similar manner to the control lever 29 shown in FIG. 5. The feed lever 110 is pivotally mounted on a shaft 112a which is carried by a support member 112 secured to the bottom plate 1a (see FIG. 5). A spring 113 is disposed on the shaft 112a and has one end secured to the lever 110 and its other end anchored to the bottom plate 1a, whereby the support member 112 is biased to rotate counterclockwise about the shaft 112a, as viewed in FIG. 23. The feed lever 110 normally assumes a position shown in solid line in FIG. 23. This position is maintained by the abutment achieved under the resilience of the spring 113 between the lower surface of the top plate 2 and a lower flange 13a on the button 13, which button is disposed on an extension 110c formed on the end of the lever 110.

Figure 23:
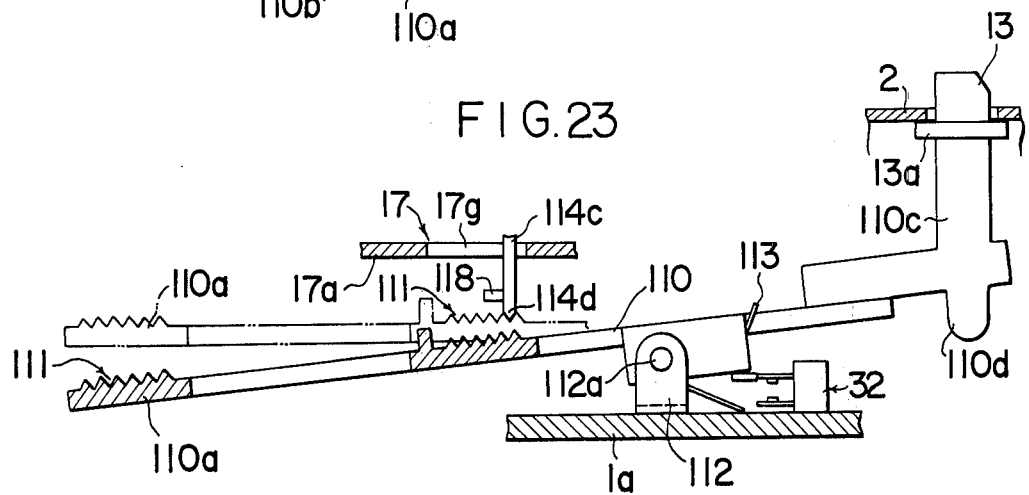
FIG. 23 is a front view, partly in section, of the feed lever shown in FIG. 22.
Figure 24:
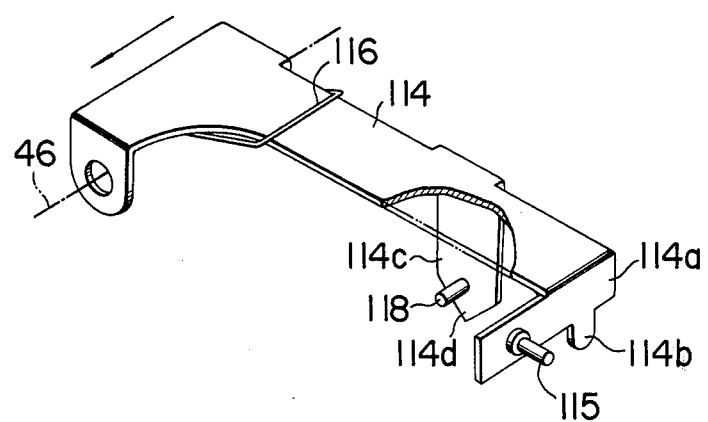
FIG. 24 is a perspective view of an operating lever used in combination with another form of head feed means.
Figure 25:
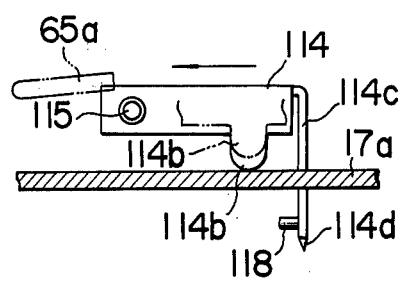
FIG. 25 is a front view, illustrating the positional relationship between the operating lever and the control piece of the constraining lever.

Referring to FIG. 24, an operating lever 114, which is pivotally mounted on the guide shaft 46 at one end in a similar manner to the operating lever 57 shown in FIG. 9, is formed with a downwardly depending piece 114a at its free end. A control pin 115 adapted to engage the control piece 65a (see FIG. 9) is fixedly mounted on the piece 114a, and a projection 114b extends downwardly from the lower edge of the piece 114a. A spring 116 which is constructed in the same manner as the spring 59 of the previous embodiment (see FIG. 9) causes the extension 114b to bear against the bottom plate 17a of the turntable 17 (see FIG. 9), as shown in FIG. 25. Along its one lateral edge, the operating lever 114 is formed with a downwardly depending arm 114c, which extends through an elongate slot 17g (FIG. 23) formed in the bottom plate 17a along the axial direction of the guide shaft 46. A pin 118 is fixedly mounted on the depending arm 114c, the free end of which arm is formed as a tip 114d having an acute angle, thus serving as a guide stylus.

Referring back to FIG. 23, when the button 13 is depressed against the resilience of the spring 113, until the projection 110d of the feed lever 110 abuts against the baseplate 1a, the lever 110 rotates clockwise about the shaft 112a from the position shown in solid line to the position shown in phantom line, whereby the contacts of the switch member 32 are closed to initiate a rotation of the turntable 17 in the direction of the arrow A (see FIG. 9). As the feed lever 110 rotates clockwise, the disc portion 110a is raised to a horizontal position, and the tip 114d of the operating lever 114 engages the guide groove 111 in the disc portion 110a at the start point thereof. At this time, the depending arm 114c is pushed up slightly. Specifically, referring to FIG. 25, the extension 114b of the operating lever 114 becomes spaced, though slightly, from the bottom plate 17a, as shown in phantom line in FIG. 25. Under this condition, the operating lever 114 continues to move in the direction of the arrow during the rotation of the turntable 17. The magnetic head 9 (FIG. 9) is fed by the holder 35 and the support lever 33, from its start toward its terminal position.

Referring again to FIG. 23, when the button 13 is released at an intermediate point during a record/playback operation, the feed lever 110 rotates from the position shown in phantom line to the position shown in solid line under the resilience of the spring 113. Consequently, the tip 114d of the operating lever 114 is disengaged from the guide groove 111 at an intermediate point thereof, whereby the extension 114b abuts against the bottom plate 17a again (see FIG. 25). At the same time the operating lever 114 returns to its original position under the resilience of the spring 56, and the magnetic head 9 is instantaneously returned to its start position through the holder 35 and the support lever 33. During the returning movement of the operating lever 114, the extension 114b thereof moves while maintaining abutment against the bottom plate 17a, so that since the tip 114d cannot move further downward, the tip 114d cannot engage the guide groove 111 again unless the button 13 is operated during the time the magnetic head 9 returns to its start position. In other words, the tip 114d is maintained disengaged from the guide groove 111 by preventing a downward movement of the extension 114b and by retracting the feed lever 110 under the resilience of the spring 113. During the described movement of the operating lever 114, the control pin 115 (FIG. 25) operates in the following manner.

Figure 26:
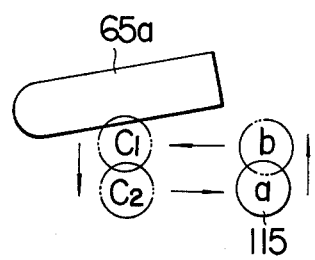
FIGS. 26 and 27 are schematic views illustrating the movement of the control pin of the operating lever relative to the control piece of the constraining lever.

Referring to FIG. 26, the control pin 115 normally assumes a position $a$ but is displaced to a position $b$ as the depending arm 114c of the operating lever 114 is slightly raised by the guide groove 111 in the feed lever 110. Subsequently, a feeding action by the guide groove 111 causes it to move to a position $c_1$ and when the button 13 is released at such an intermediate position, the control pin 115 moves downward from the position $c_1$ to a position $c_2$. In other words, the extension 114b bears against the bottom plate 17a again (see FIG. 25). During the returning movement of the operating lever 114 to its original position, the control pin 115 returns from the position $c_2$ to the position $a$.

Figure 27:
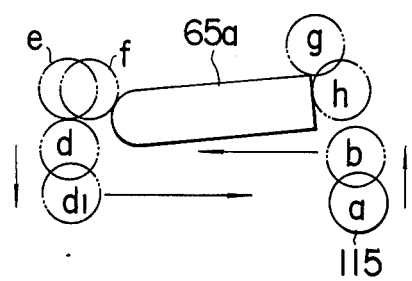

Similarly, the magnetic head 9 can be returned from its terminal position. Referring to FIG. 23, a feeding operation for the magnetic head 9 commences with the depression of the button 13 as mentioned previously. The control pin 115 on the operating lever 114, which normally assumes a position as shown in FIG. 25 relative to the control piece 65a of the constraining lever 65 (FIG. 9), or a position $a$ shown in FIG. 27, moves upward to a position $b$ and thence to a position $d$, as the operating lever 114 moves in the direction of the arrow shown in FIG. 25. During the movement of the pin 115 from the position $b$ to the position $d$, the control piece 65a is slightly pushed up, thus causing an angular movement of the constraining lever 65 though slightly. A record/playback operation is terminated when the control pin 115 reaches the position $d$. Thus, when the magnetic head 9 reaches its terminal position, a pin 118 on the operating lever 114 (see FIG. 24) rides a bevelled edge 120a to a top 120b of a feed release cam 120 which is mounted on the disc portion 110a of the feed lever 110 (FIG. 22), whereby the operating lever 114 rotates in a direction in which its free end moves upward, thus disengaging the tip 114d from the guide groove 111 formed in the disc portion 110a of the feed lever 110. At this time, the control pin 115 on the operating lever 114 is displaced from the position $d$ to a position $e$, and at the same time as the disengagement mentioned above, the spring 56 (FIG. 9) and the spring 116 (FIG. 24) cause it to move through positions $f, g, h$ and $b$ to the position $a$ while bearing against the upper surface of the control piece 65a. Thus, the magnetic head 9 returns to its start position, and the tip 114d of the operating lever 114 again engages the guide groove 111 in the feed lever 110, thus repeating a feeding operation for the magnetic head 9 and hence the operation described above.

Figure 28:
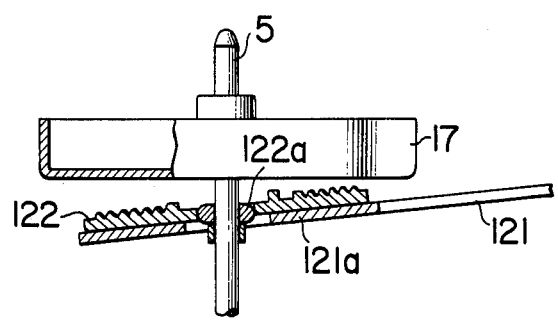
FIG. 28 is a side elevation, partly in section, of another form of feed lever.

It will be understood that the described operation may be operated as many times as desired to repeat a record/playback operation by maintaining the button 13 depressed. When it is desired to perform a single cycle of a record/playback operation, the button 13 is released when the control pin 115 has moved through the positions $a$ and $b$ to the position $d$ (FIG. 27) or when a record/playback operation is completed. Thereupon, the tip 114d of the operating lever 114 is disengaged from the guide groove 111 in the feed lever 110, and the extension 114b of the operating lever 114 again bears against the bottom plate 17a. In this manner, the control pin 115 moves downward from the position $d$ to a position $d_1$ and returns to the position $a$ under the resilience of the spring 56 (FIG. 9). At this time, the magnetic head 9 also returns to its start position. When the button 13 is released with some time delay after the control pin 115 has reached the position $d$, the pin 118 on the operating lever 114 rides up to the top 120b of the feed release cam 120 (FIG. 22), so that the control pin 115 moves along the upper surface of the control piece 65a, thus passing through the positions $g, h$ and $b$ to the position $a$. In this manner, the present embodiment is also arranged so that the magnetic head can be instantaneously returned to its start position. While in FIG. 23, the guide groove 111 is directly formed in the disc portion 110a of the feed lever 110, the guide groove may be formed in a separate disc which is mounted on the disc portion 110a. Alternatively, as shown in FIG. 28, there may be provided a feed lever 121 having a disc portion 121a on which a disc 122 having a guide groove formed therein is mounted in a non-rotatable manner relative thereto, while a bushing 122a having a spherical periphery may be fitted into the disc 122, thus supporting the disc 122 in a rockable manner. This permits a proper positioning of the disc and positively prevents the misalignment with the track. When a card 3 having a plurality of magnetic tracks thereon is placed on the top plate 2 of the reproducer of FIG. 1, in the position as it is shown in FIG. 2, the sound "This is a book." is reproduced When the card 3 is placed on the top plate 2 in the rotated position, the sound "That is a pen." is reproduced. In this manner, two blocks of sound may be recorded or reproduced from a card of a size comparable to the usual namecard, thus providing a very efficient recording and reproducing scheme.

Figure 29:
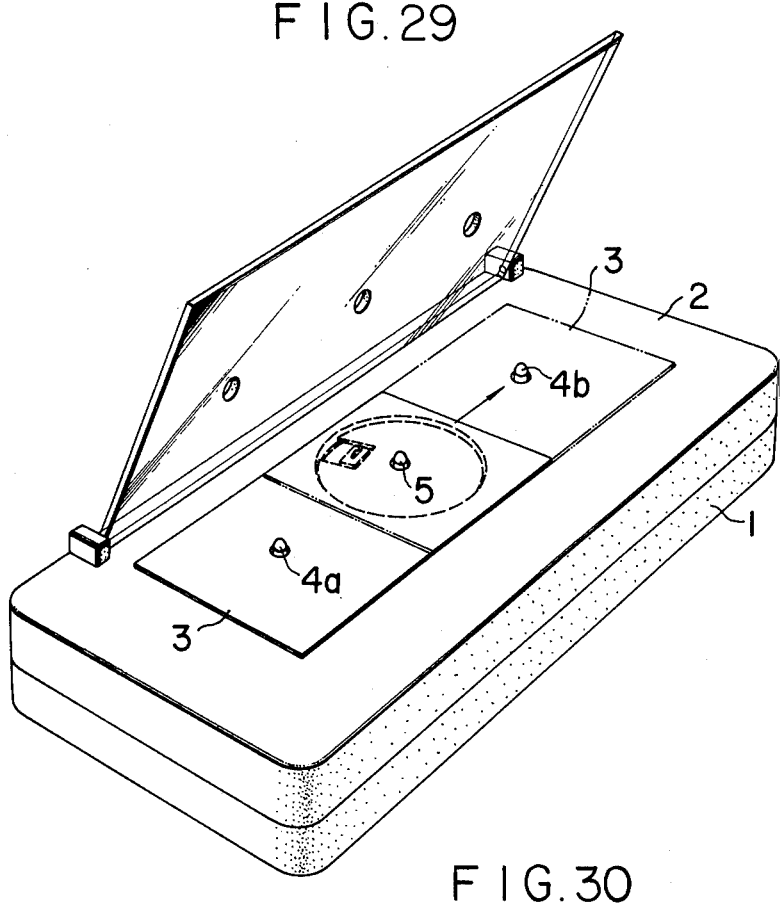
FIG. 29 is a perspective view of another embodiment of the invention.
Figure 30:
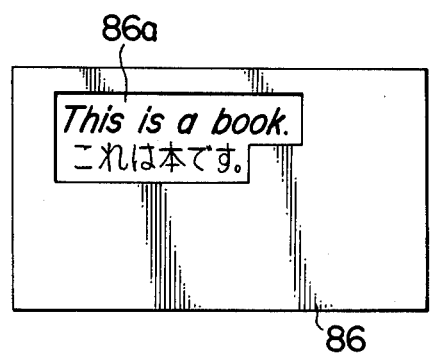
FIG. 30 is a plan view of a card retaining screen.

As a further development, an arrangement such as shown in FIG. 29 may be implemented in which the pair of magnetic tracks are formed so as to run in the same spiral direction, and a pair of locating pins 4a, 4b are disposed in the top plate 2 so as to accommodate a ard which is slidable from a position shown in solid line to a position shown in phantom line. FIG. 30 shows a card retaining screen 86 formed of an opaque material which is formed with an indicator window 86 so that a legible information indicative of the content recorded on the magnetic track is visible through the window when the retaining plate 6 is placed thereon. This avoids the difficulties sometimes experienced by a student when he desires to know whether he is reproducing from the magnetic track 11 or the magnetic track 12. A plurality of card retaining screws may be provided so as to correspond to a variety of cards. Alternatively, the retaining plate itself may be similarly constructed as the card retaining screen mentioned above.

Figure 31:
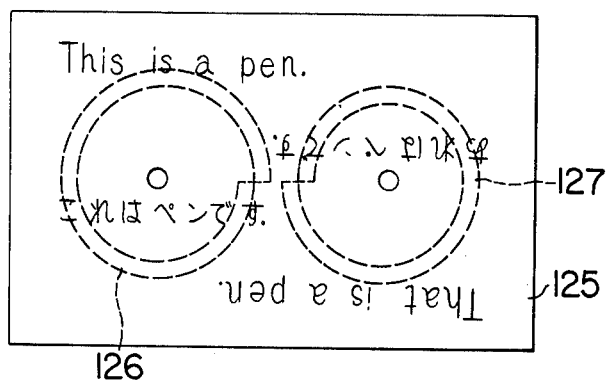
FIG. 31 is a plan view of another form of card.
Figure 32:
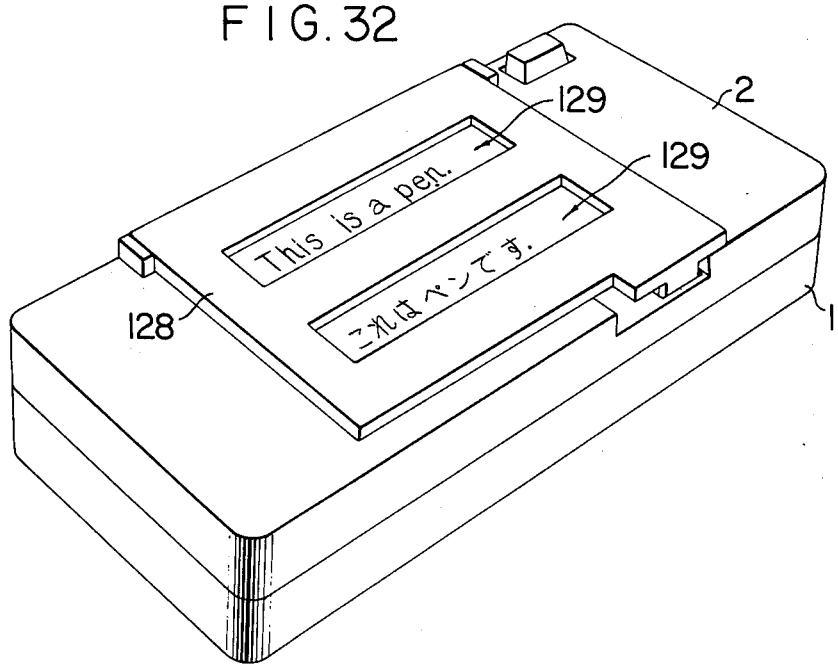
FIG. 32 is a perspective view of a recording reproducer which may be used with the card shown in FIG. 31.
Figure 33:
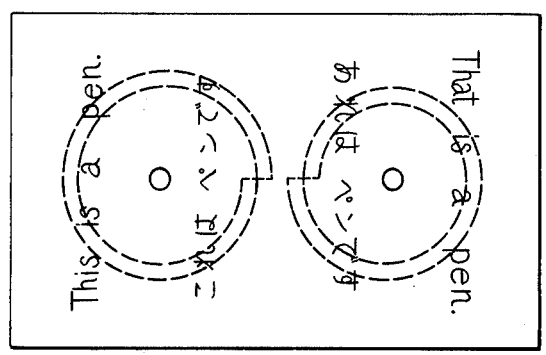
FIG. 33 is a plan view of a further example of card.
Figure 34:
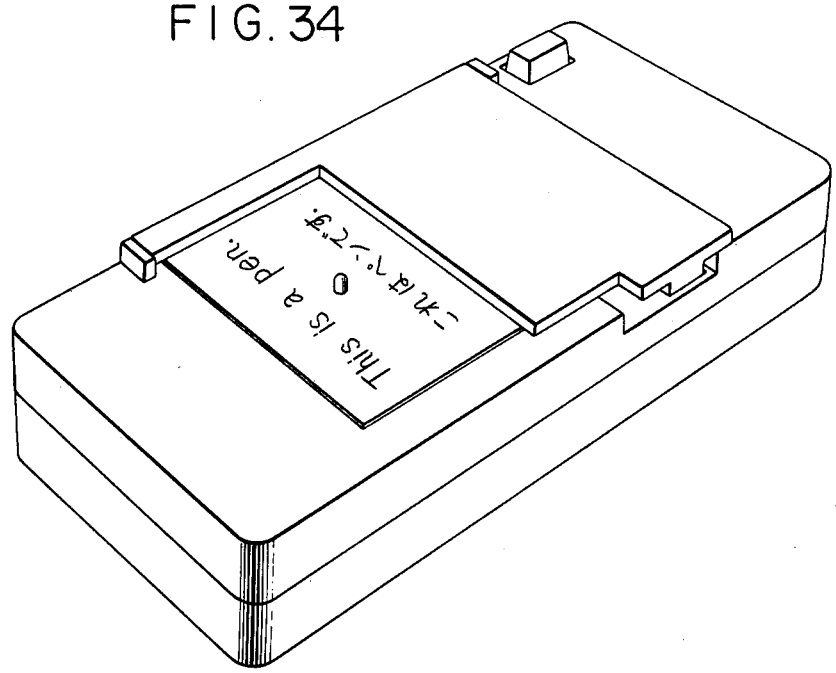
FIG. 34 is a perspective view of a further recording reproducer which may be used with the card shown in FIG. 33.

Specifically, FIG. 31 shows a card 125 having a pair of magnetic tracks 126, 127 formed on the back surface thereof. The front surface of the card 125 carries legible information such as "This is a pen." corresponding to the content recorded on the magnetic track 127 and "That is a pen." corresponding to the content recorded on the magnetic track 126. FIG. 32 shows a retaining plate 128 which may be used in combination with the card 125. The retaining plate 128 is formed with notched windows 129 which permit the legible information to be viewed therethrough. In this manner, the recorded content can be visually recognized by the student when the card is located in place on the top plate 2 of a reproducer and covered with the retaining plate 128. It is understood that when the card 125 is loaded in its reverse position, different information such as "That is a pen." will be visible through the notched windows 129. FIGS. 33 and 34 show a combination of different arrangements for the card and the retaining plate. Thus, the retaining plate is provided with a notch or a transparent section through which the information is visible.

Figure 35:
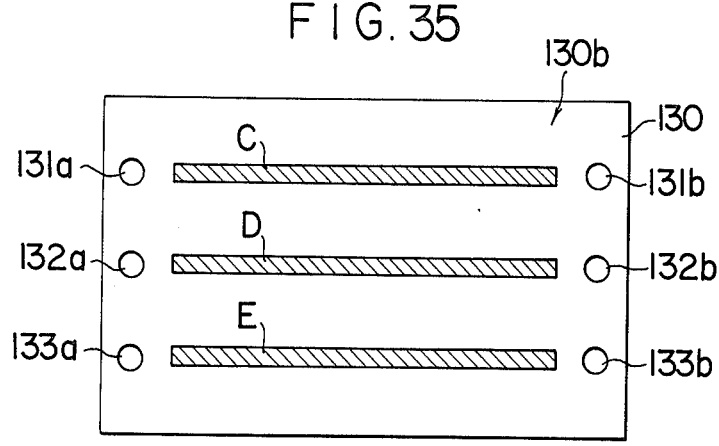
FIG. 35 is a plan view of an exemplary card having a plurality of sound tracks formed on its back surface.
Figure 36:
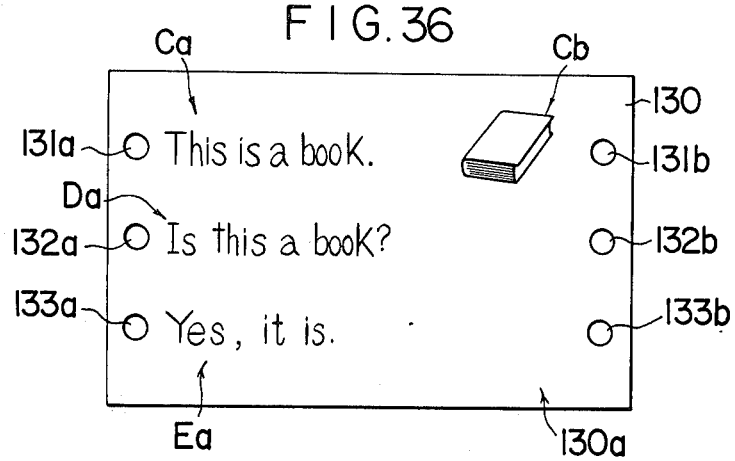
FIG. 36 is a rear view, showing the back surface of the card shown in FIG. 35.

The card may be provided with magnetic tracks of other than a spiral configuration. Referring to FIG. 35, there is shown a card 130 having a plurality of rectilinearly extending sound tracks C, D and E on its back surface 130b and formed with a plurality of locating apertures 131a, 131b, 132a, 132b, 133a, 133b corresponding to the respective tracks. The front surface 130a of card 130 is provided with indications Ca, Cb, Da, Ea such as pictures or characters representing the content recorded on the respective sound tracks, as shown in FIG. 36. When reproducing from the card 130, for example, from the sound track C, the locating apertures 131a, 131b are aligned with locating pins, not shown, which are provided on the top plate of the reproducer, and the head operated for a rectilinear scanning, whereby the sound corresponding to the indication Ca is reproduced from the track C.

Figure 37:
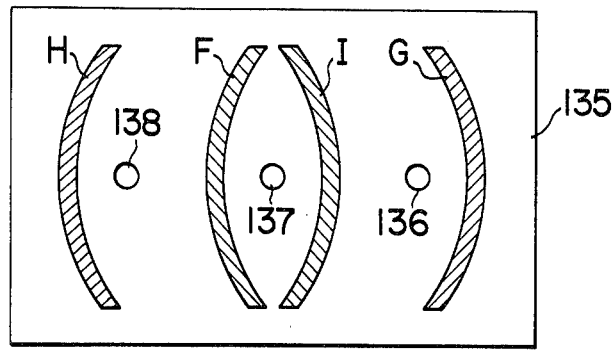
FIG. 37 is a plan view of another example of card.

FIG. 37 shows another card 135 in which a plurality of locating apertures 136, 137, 138 are formed. Formed on the back surface of the card 135 are plurality of sound tracks F, G, H and I. These tracks are in the form of an arc of a circle which is centered about a corresponding locating aperture. Specifically, the track F is centered about the aperture 136, the tracks G and H are centered about the aperture 137 and the track I is centered about the aperture 138. These tracks and locating apertures are arranged such that the distance between a particular sound track and its corresponding locating aperture is uniform while avoiding an overlapping of the sound tracks. While not shown, it will be appreciated that the front surface of the card 135 is provided with suitable indications such as illustrations or characters which represent the content recorded on the tracks F to I. When reproducing from the card 135, for example, from the track F, the locating aperture 136 is engaged with the locating pin, and the head, not shown, is driven along an arcuate path. In order to prevent misalignment, it is preferable that at least two of the locating apertures are engaged by two locating pins. The provision of illustrations or characters on the front surface so as to indicate the content recorded on the magnetic tracks formed on the back surface of the card contributes to enhancing the learning effect.

Figure 38:
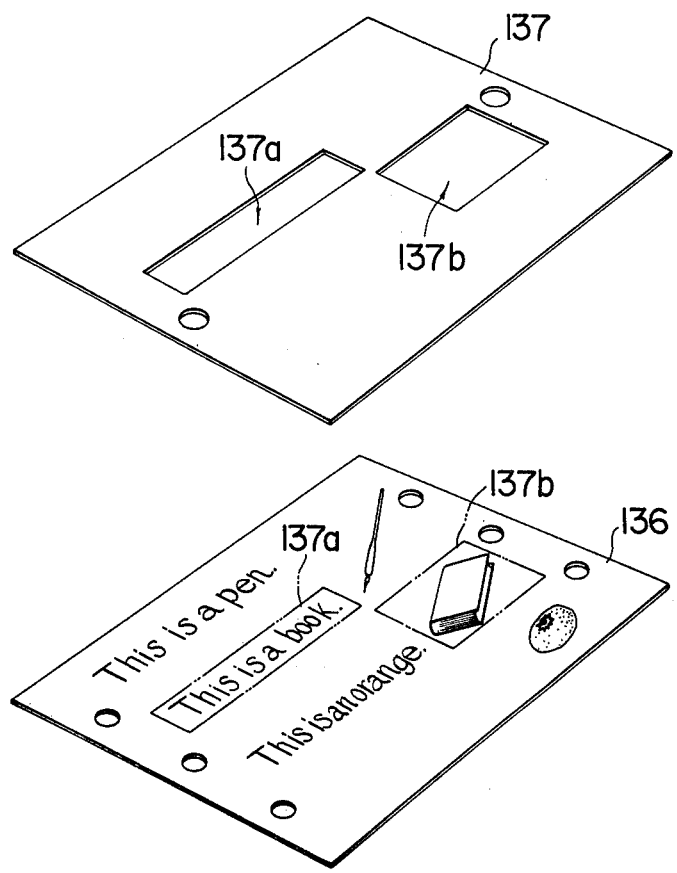
FIG. 38 is a perspective view of a further example of card and a mask placed thereon.

A more sophisticated arrangement is shown in FIG. 38 where a card 136 having illustrations or characters indicated on the front surface is used in combination with a mask 137 having a plurality of windows 137a, 137b formed therein so that the content being reproduced can only be recognized when the mask 137 is placed in alignment with the card 136.

Figure 39:
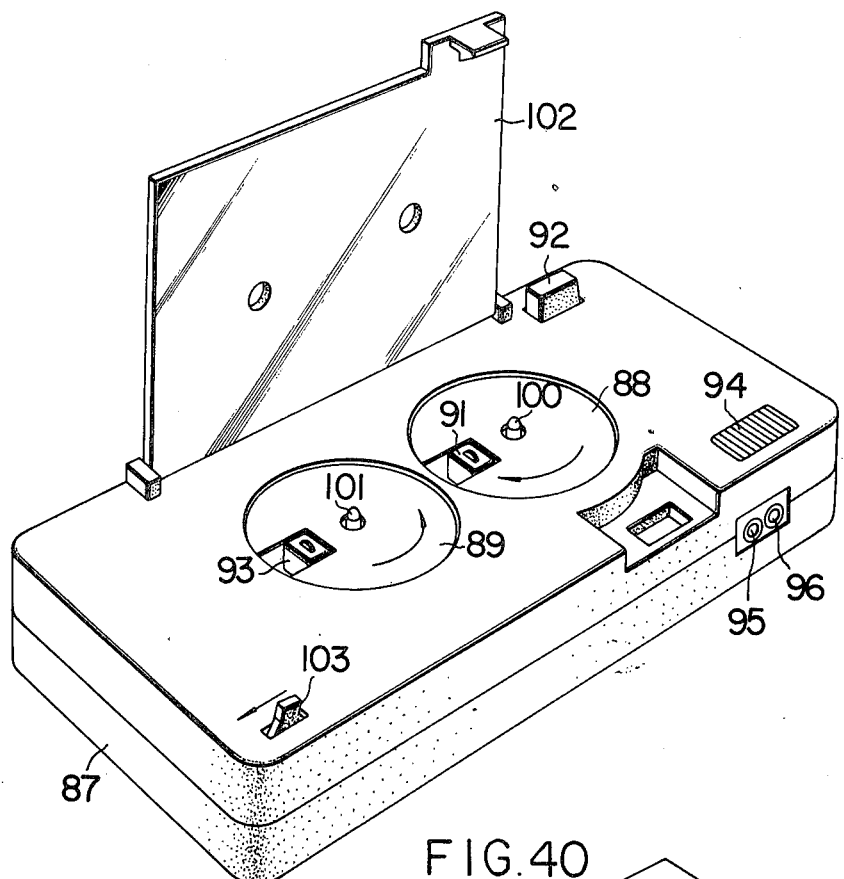
FIG. 39 is a perspective view of a recording reproducer having a pair of record/playback units.
Figure 40:
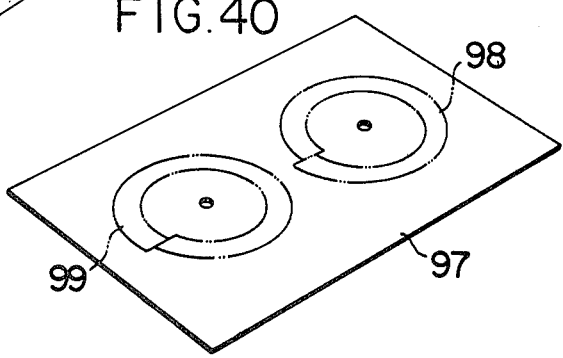
FIG. 40 is a perspective view of one exemplary card which may be used in the reproducer shown in FIG. 39.

FIG. 39 shows a language laboratory system which is formed by providing a pair of recording and reproducing units, each including a turntable, a magnetic head and an automatic return mechanism as described in connection with the preceding embodiments. In FIG. 39, the recording reproducer shown includes a casing 87 which incorporates a pair of turntables, not shown, and a pair of panels 88, 89 that are integrally mounted with the turntables for rotation in the respective directions indicated by arrows. A magnetic head 91 is associated with the panel 88 and follows a spiral path when a button 92 is depressed. As in the previous embodiments, the head is automatically returned from its terminal to its start position. The turntable associated with the panel 89 is arranged to rotate in the opposite direction from the turntable associated with the panel 88, whereby a magnetic head 93 associated with the panel 89 follows a spiral path in the opposite direction from the head 91. Numerals 94, 95 and 96 represent a microphone head, an earphone jack and a connection jack for an external microphone, respectively. FIG. 40 shows the back surface of a card 97 of a size comparable to a namecard on which are formed a magnetic track 98 having a master recording, for example, the pronunciation of a teacher, as well as another magnetic track 99 which may be utilized by the student for recording his own pronunciation. The card 97 is adapted to be placed on the top plate so that a pair of openings formed therein are engaged by pins 100, 101. When a retaining plate 102 is closed to cover the card and the pushbutton 92 depressed, the heads 91, 93 initiate their motion along respective spiral paths, whereby the pronunciation of the teacher is reproduced through an earphone. At the same time, the pronunciation of the student is recorded through a head 94 operatively connected with a microphone, thus forming the magnetic track 99 as shown in FIG. 40. Then, a change-over switch 103 is thrown as indicated by an arrow. This changes the mode of operation of the reproducer so as to reproduce only the pronunciation of the student. In this manner, the reproducer can be utilized for learning a foreign language, for example, by comparing the pronunciation of the student with the master recording. In FIG. 39, the pair of turntables are adapted to rotate in the opposite directions. However, the turntables may rotate in the same direction. In this instance, the pair of magnetic tracks formed on the card 97 shown in FIG. 40 are formed to run in the same spiral direction.

Figure 41:
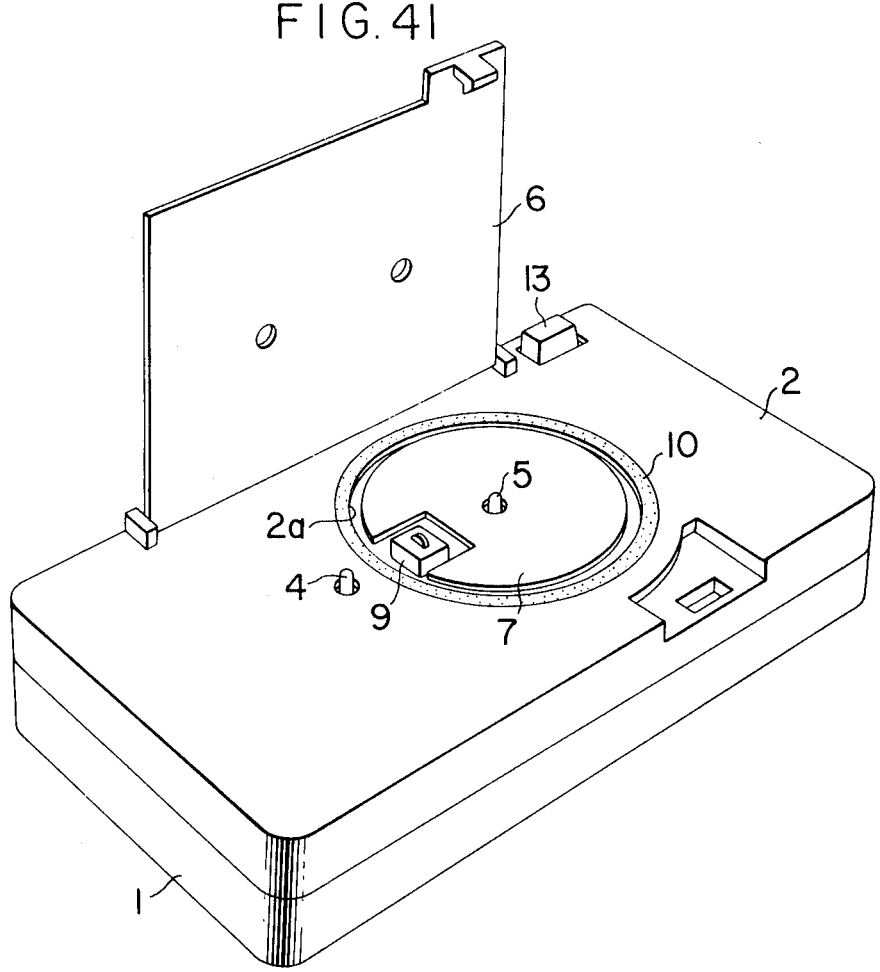
FIG. 41 is a perspective view of a recording reproducer having a rubber ring disposed around the inner periphery of a circular opening in the top plate.
Figure 42:
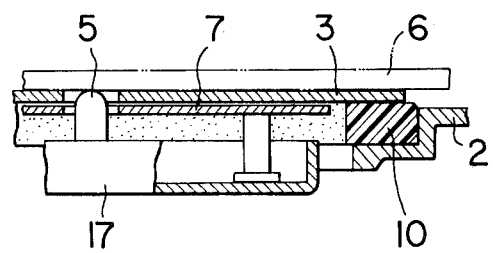
FIG. 42 is a cross section, showing the mounting of the ring in the circular opening in the top plate.

FIG. 41 shows an arrangement for positively retaining a card placed on the top plate 2. Specifically, a ring 10 of an elastic material such as rubber is fitted around the inner periphery of the circular opening 2a. As shown in FIG. 42, the upper surface of the ring 10 projects slightly above the upper surface of the top plate 2, and the card 3 is placed on top of the ring and then retained by the retaining plate 6. With this arrangement, the friction between the card 3 and the ring 10 is greater than the friction between the card 3 and the retaining plate 6, whereby the card is immovably maintained in a proper position. In addition, a seal is formed between the ring 10 and the card. Furthermore, vibrations as may be produced by the drive motor of the apparatus are absorbed by the ring 10, thereby preventing an adverse influence of these vibrations upon the positioning of the card and assuring an improved tone quality.

What is claimed is:

1. A recording reproducer for use with a card having a sound track formed on its surface, comprising:
   a rotatable turntable;
   transducer means disposed on said turntable for following said sound track to sense the content thereof;
   support means for movably supporting the transducer means on said turntable;
   feed means for driving the support means to move the transducer means radially of the turntable between a start and a terminal position;
   means for engaging the feed means with the support means to move the transducer means from its start position;
   means for releasing the engagement of the feed means with the support means when the transducer means has moved to its terminal position;

means for maintaining the release of the engagement until the transducer means has returned to its start position;

return means operatively connected to the support means for rapidly returning the transducer means;

a stationary shaft for supporting the rotatable turntable;

a disc member substantially integrally mounted on said stationary shaft and having a spirally extending guide groove of V-shaped cross section formed in the upper surface thereof; and an operating lever means for operatively supporting the transducer means such that both are slidable on and rotatable with the turntable, said lever means having an edge of an acute angle which engages the guide groove, thereby moving the transducer means radially of the turntable.

2. A recording reproducer for use with a card having a sound track formed on its surface, comprising:

a rotatable turntable;

transducer means disposed on said turntable for following said sound track to sense the content thereof;

support means for movably supporting the transducer means on said turntable comprising:

a support member and an operating member;

means for mounting said support member and said operating lever for translational motion together on said turntable; and means for mounting said operating lever for pivoting with respect to said turntable;

feed means for driving the support means to move the transducer means radially of the turntable between a start and a terminal position;

means for engaging the feed means with the support means to move the transducer means from its start position;

means for releasing the engagement of the feed means with the support means when the transducer means has moved to its terminal position;

means for maintaining the release of the engagement until the transducer means has returned to its start position; and return means operatively connected to the support means for rapidly returning the transducer means.

3. A recording reproducer according to claim 2 wherein said maintaining means comprises:

pin means on said operating lever for integral movement therewith; and constraining lever means for engaging said pin means during translational movement of said operating lever for constraining the pivoting thereof.

4. A recording reproducer according to claim 3 further comprising means for releasing the engagement of the feed means with the support means at any position intermediate the start and terminal positions.

5. A recording reproducer according to claim 4 wherein said intermediate releasing means comprises means for mounting said constraining lever means for pivoting under the action of said pin means when said operating lever is pivoted while at an intermediate position.

6. A recording reproducer comprising the combination of:

a card having a sound track formed on one of its surfaces and provided with legible information on its other surface which corresponds to a content recorded on the sound track; and a sound reproducing unit comprising:

transducer means for following the sound track to sense the content thereof;

feed means for feeding the transducer means from a start to a terminal position on said sound track;

a pushbutton;

means responsive to the actuation of the pushbutton for engaging the transducer means and the feed means to move the transducer means from the start position, said engaging means comprising:

means for supporting said transducer means having means thereon for pivoting from a rest position in response to the actuation of said pushbutton; and means on said pivoting means for cooperating with said feed means;

means responsive to a further actuation of the pushbutton when the transducer means has moved to an intermediate position between the start and the terminal positions for releasing the engagement of the feed means with the transducer means, said releasing means comprising:

means for returning said pivoting means to said rest position in response to further actuation of said pushbutton;

means for maintaining the release until the transducer means has returned from the intermediate position to the start position; and return means for rapidly performing the returning movement; and control lever means, pivotable in response to the actuation of said pushbutton for pivoting said pivoting means from said rest position and wherein said returning means comprises spring means urging said control lever means against pivoting.

* * * * *